United States Patent [19]

Jones, Jr.

[11] 3,715,496

[45] Feb. 6, 1973

[54] DIGITAL BAND-PASS FILTER FOR A SINGLE CIRCUIT FULL DUPLEX TRANSMISSION SYSTEM

[75] Inventor: Gardner D. Jones, Jr., Raleigh, N.C.

[73] Assignee: International Business Machines Corporation, Armonk, N.Y.

[22] Filed: Oct. 21, 1971

[21] Appl. No.: 191,295

[52] U.S. Cl. ....................178/58, 343/175, 178/66 R, 325/30, 325/320

[51] Int. Cl. ....................H04l 5/14

[58] Field of Search ....................178/66 R, 58–60; 333/70 R, 70 A, 70 T; 307/233, 295; 328/167; 179/2 DP; 320/30, 320; 343/175

[56] References Cited

UNITED STATES PATENTS

| | | | |
|---|---|---|---|
| 3,577,202 | 5/1971 | Brightman | 178/58 R |
| 3,655,915 | 4/1972 | Liberman | 178/58 R |
| 3,651,433 | 3/1972 | Langley | 330/70 T |
| 3,543,172 | 11/1970 | Seppeler | 307/233 |
| 3,649,759 | 3/1972 | Buzzard | 179/2 DP |
| 3,566,031 | 2/1971 | Carbone | 178/59 |

*Primary Examiner*—Ralph D. Blakeslee
*Assistant Examiner*—Thomas D'Amico
*Attorney*—Dewey J. Cunningham et al.

[57] ABSTRACT

A full duplex data communications system using a single transmission circuit is shown. Each terminal of the system has its receiver circuit provided with a digital filter to remove from its input circuit, the frequencies being used for data transmission at that terminal. The digital filter is switchable by the data signal to be transmitted and will be set to block from the receiver, the particular frequencies then being used to transmit data. In the preferred embodiment, the signal on the transmission line is converted to a delta modulated signal which is combined with its prior signal delayed by an interval dependent upon the data being transmitted from that terminal to generate a delta modulated filtered signal carrying the received data. The filtered signal is then converted to recover the received data.

4 Claims, 5 Drawing Figures

INVENTOR
GARDNER D. JONES, JR.

BY Delbert C. Thomas
ATTORNEY

DIGITAL BAND-PASS FILTER FOR A SINGLE CIRCUIT FULL DUPLEX TRANSMISSION SYSTEM

OBJECTS OF THE INVENTION

A data transmission using a single communications circuit to transmit data in a full duplex mode between two terminals is already well known and is in public use. The system uses two different frequency bands, one for each direction of transmission and provides each receiver with a band-pass filter to allow only the signals emanating from the other terminal to be processed. Such filters are large and expensive since they require tuned circuits in the audio frequency range and are additionally not completely effective. The requirement of passing a band of frequencies or conversely of blocking such a band received from the local transmitter will prevent the use of a very sharp filter and therefore will allow some of the unwanted frequencies to pass into the receiver. Such undesired signals can cause distortion and may introduce data errors.

It is therefore an object of this invention to provide a full duplex communications system using only a single transmission circuit and including an improved transmitter-receiver isolation filter.

It is another object of the invention to provide in such a communications system an isolation filter which is selectively settable to the frequency being transmitted from a station to thereby remove its effect on the receiver at the station.

It is a further object to provide an isolation filter which is automatically settable by the data to be transmitted from a terminal to block application to a receiver of the signal frequencies transmitting the data.

Still another object is to disclose a digitally operating transmission system which requires no large and expensive frequency responsive components to isolate a receiver from the signals being transmitted from an adjacent transmitter.

A still further object is to devise a filter having a very sharp attenuation characteristic at its fundamental frequency and at odd harmonics thereof and constructed of digital type, on-off circuits only.

Another object is the provision of a delta modulated filter connected in the input circuit of a receiver to neutralize the effect on said receiver of a strong signal applied to the input of said receiver.

All of these and other objects, features and advantages will be apparent in the following description of a preferred embodiment of the invention as shown in the accompanying drawings.

OPERATION OF THE SYSTEM

Figure 1:
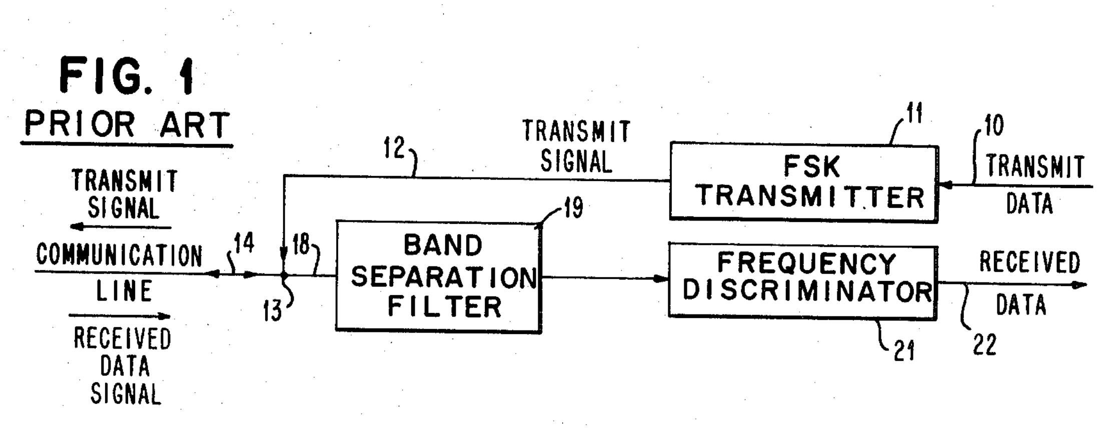
FIG. 1 PRIOR ART
FIG. 1 is a schematic diagram of a known type of transmission system.

One known type of transmission system, identified as the 103 type, enables the use of a single pair of telephone type wires for full duplex data communications. The signals are transmitted in one direction using one frequency band and are transmitted in the other direction using a different frequency band. At each end of the line, the frequency band used for transmissions from that end is filtered out of the total signal on the line leaving only the signal received from the other end of the line. As indicated in FIG. 1, digital data to be transmitted is received on a line 10 and controls a frequency shift keying (FSK) transmitter 11 to supply to an output line 12, two distinct frequency signals in a narrow frequency band, e.g. 1070 Hz for a "zero" data bit and 1270 Hz for a "one" data bit. These signals are passed through a junction 13 to a communications line 14.

Data will also be received from the communications line 14 at the junction 13 in a different frequency band, e.g. 2025 Hz for a "zero" data bit and 2225 Hz for a "one" data bit. Both the transmitted and received signals will be passed on line 18 from junction 13 to a band separation filter 19 which will remove the transmitted frequency band including the 1025 Hz and 1225 Hz signals and will pass the receiving band signals of 2025 Hz and 2225 Hz to a frequency discriminator 21. The discriminator 21 will respond to the received signals to put a corresponding data signal on output line 22.

Figure 2:
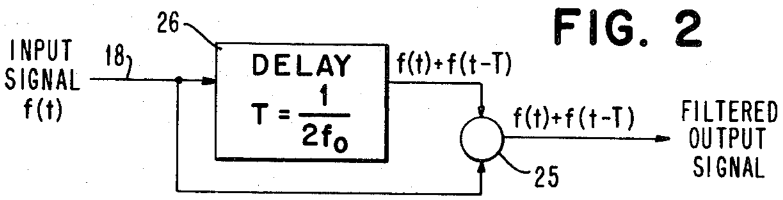
FIG. 2 is a time delay filter to suppress a selected frequency and its harmonics in a transmitted signal.
Figure 2A:
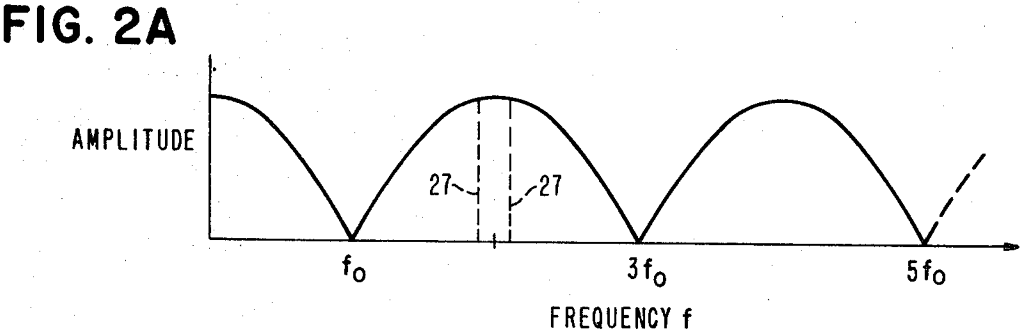
FIG. 2A is a graph showing the transmission characteristics of the filter of FIG. 2.

A time delay filter which can be used in the band elimination filter 19 of FIG. 1 is shown in FIGS. 2 and 2A. Here an input signal on a lead 18 corresponding to lead 18, FIG. 1, is applied to one side of a mixer 25 and also to a delay line 26. Delay line 26 has a delay equal to one-half cycle of the fundamental frequency which is to be filtered and has its output connected to the other side of mixer 25. When the two signals applied to the mixer 25 are of equal effect, the frequency response of the circuit is as shown in FIG. 2A. It will be seen that the signal at the fundamental frequency is cut out completely as is every odd harmonic of that frequency. However, frequencies near even harmonics of the fundamental are not appreciably affected and if two frequencies as indicated by the dotted lines 27 are chosen for data transmission, they will pass through the filter without attenuation and can be used for the received data signal in a transmission system.

SPECIFIC EMBODIMENT OF THE INVENTION

Figure 3:
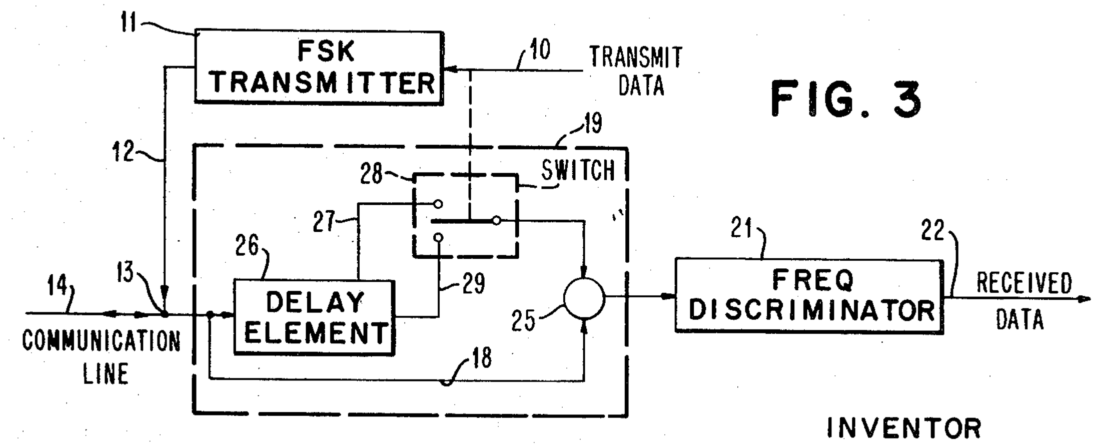
FIG. 3 is a block diagram of an embodiment of the present invention showing the use of a variable time delay filter for full duplex transmissions.

FIG. 3 illustrates how applicant uses the filter of FIG. 2 in a system as in FIG. 1. Here the delay element 26 and mixer 25 form the band separation filter 19. However, the filter of FIG. 2 has a very narrow notch frequency with steep sides and cannot be set to provide satisfactory attenuation for both of the transmit frequencies. The delay element 26 is therefore adjusted to have a time delay equal to one-half of a cycle of the slower speed transmit signal, i.e. 1070 Hz and is provided with a tapped point 27 at a delay equal to one-half of a cycle of the higher speed transmit signal, i.e. 1270 Hz. A switch 28 is provided to connect either the output lead 29 of the time delay 26 or the tapped lead 27 to the upper input to mixer 25 so that the filter may be set to eliminate either the 1070 Hz or the 1270 Hz frequencies. Switch 28 is controlled by the data signal on the transmit data line 10 so that it will be set to cause elimination of the frequency being transmitted by the FSK transmitter 11 at any time. Thus, except for the short, part cycle interval immediately after a changeover of switch 28, the filter 19 will be effective to remove substantially all of the signals being transmitted on the communications line 14 from the input to the frequency discriminator 21 which is therefore free to act on the received signal to decode its data content without interference from the relatively stronger transmitted signal.

Figure 4:
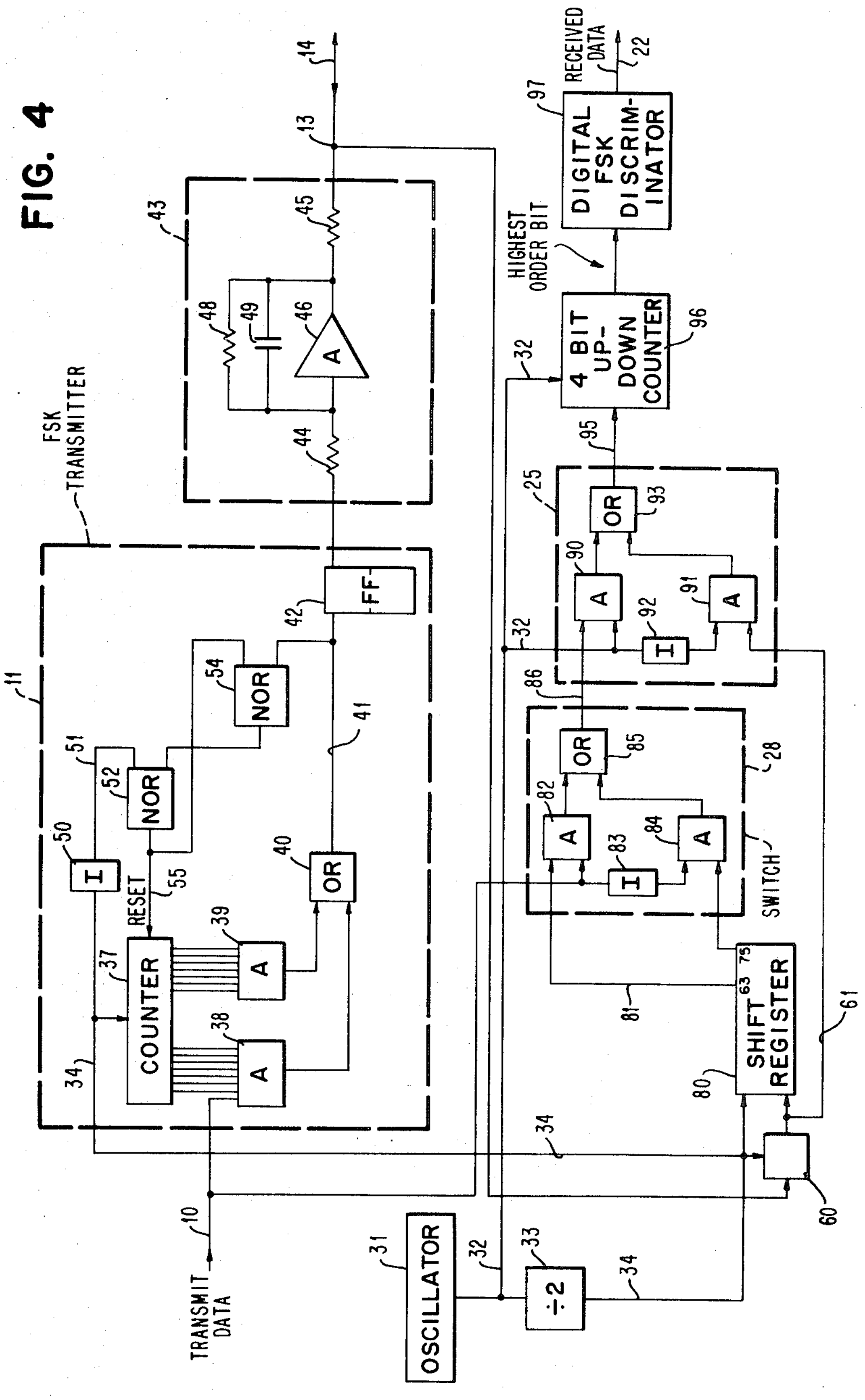
FIG. 4 is a detailed schematic showing of a digital implementation of the filter and transmitter implementation.

FIG. 4 shows a digitally operating embodiment of the invention which does not require precision delay lines or reactive components but rather uses digital type on-off circuitry. This digital embodiment will be driven by an oscillator circuit 31 operating at a frequency which is approximately a high integral multiple of each of the nominal transmit frequencies, e.g. 321.0 KHz which is 300 times the 1070 Hz and 252 times the 1270 Hz signal frequencies to within a fraction of a percent. The oscillator output 32 is divided by 2 in divider 33 to provide a basic clock output on line 34.

The FSK transmitter of this embodiment comprises a conventional seven-bit wide counter 37 driven from clock output 34 and provided with two AND circuits 38 and 39. AND 38 is connected to the counter 37 and to the data input lead 10 to give an output signal to an OR circuit 40 when the counter 37 reaches a count of 63, i.e. one-fourth of the 252 multiple and data lead 10 has a data signal thereon. The other AND is connected to counter 37 to give an output signal to OR 40 while the counter 37 stands at a count of 75, i.e. one-fourth of the 300 multiple. Each output of OR 40 on a line 41 switches a flip-flop 42 whose output is thus a square wave at a frequency corresponding to the signal level then present on the data input line 10. The square wave output from flip-flop 42 is passed to a line driver 43 which will drive the communications line 14. Line driver 43 comprises an input load resistor 44 and an output resistor 45 with an operational amplifier 46 between them. A feedback circuit comprising a resistor 48 and a capacitor 49 in parallel between the input and output of amplifier 46 will convert the square wave input from flip-flop 42 to a triangular shaped output signal which will be acceptable for transmission over the line 14. Since the transmitted output signal contains only the fundamental and its odd harmonics, it is suitable for removal from the receiver input by the filter circuit 19 as is indicated in FIG. 2A. The counter 37 will be reset by means of a latch circuit at the next transition of the clock signal line 34 to a low level. As shown, an invert circuit 50 passes the clock signal as an inverted clock to its output line 51 which is an input of a first NOR circuit 52. A second NOR circuit 54 has its output connected as the other input to NOR 52 and the output 55 of NOR 52 is both the reset input to counter 37 and an input of NOR 54. The other input to NOR 54 is the output line 41 of OR circuit 40. The continuous pulsing of line 51 will usually hold NOR 52 conductive and its output 55 at a low level. Both inputs to NOR 54 are thus normally down and its output will be up to maintain NOR 52 conductive. When OR 40 is energized, its output line 41 will switch the conductive states of NOR's 52 and 54 to put a signal on lead 55 and reset counter 37. The NOR's 52 and 54 will be switched back as soon as line 51 is pulsed at the next down phase of the clock cycle.

The receiver filter to remove the transmit signal comprises a delta modulator 60 controlled by communications line 14 and pulsed by the clock signal on line 34. These delta modulators are well known devices and provide on the output 61 a pulsed output signal representative of the rate of change of the applied input signal. Conventionally, this will be alternate pulses and spaces for an unchanging input, a higher proportion of pulses for an increasing input signal and a lesser proportion of pulses for a decreasing input signal. The delta modulated output on line 61 is stored in a shift register 80 having a number of storage positions equal to the reading of counter 37 for which AND 39 will give an output and having an output 81 at the counter position corresponding to the reading of counter 37 for which AND 38 will give an output signal. As in the embodiment of FIG. 3, a switch 28 controlled by the data signal on line 10 will connect either the output of the last stage of shift register 80 or the tapped output on line 81 to the mixer 25. The switch 28 comprises an AND circuit 82 having as inputs the tapped output on line 81 and the signal on line 10 to pass the delta modulated signal when line 10 has a data bit thereon, an inverter 83 to invert the data signal from line 10, an AND circuit 84 controlled by inverter 83 to pass the delta modulated signal from the last stage of shift register 80 and an OR circuit 85 to combine the outputs of AND's 82 and 84 to an output line 86. The output signal on line 86 will therefore be the delta modulated signal from modulator 60 with a delay equal to one-half cycle of the carrier then being transmitted, and this signal on line 86 will be mixed with that on line 61 by the mixer 25. This mixer 25 is the same configuration as switch 28 with two AND circuits 90 and 91, an invert circuit 92 and an OR circuit 93. It is controlled by the double clock speed line 32 to alternately connect lines 86 and 61 to an output line 95 whose signal will therefore be a delta modulated filtered signal corresponding to the signal being received on line 14.

The counter 96 and the discriminator 97 are not a part of the inventive feature but are included to complete a disclosure of the system. Counter 96 is a non-overrunning counter and timed by the double clock signal on line 32. It is controlled by the filtered signal on line 95. At each pulse on line 32, counter 96 will be incremented or decremented in a direction controlled by the signal on line 95, i.e. up if the signal is present and down if the signal is not present. The state of the highest order bit of counter 96 is substantially the signal received on line 14 and this signal is processed in discriminator 97 to generate the received data signal on output line 22.

It will be obvious that at the other end of the communication line, the transmit and receive frequencies are interchanged and that it is the higher frequencies which are to be filtered out of the signal on the line to allow receipt of the data from the other end. The frequency change which is to be made in the clock 31 and the circuit changes in the readout AND circuits 38, 39 of counter 37 together with corresponding changes in the shift register 80 to enable filtering out of the transmit frequencies at the other end of the line will be obvious from the above description of the functions of these elements.

While the invention has been particularly shown and described with reference to preferred embodiments thereof, it will be understood by those skilled in the art that various changes in details may be made therein without departing from the spirit and scope of the invention as set out in the following claims.

What is claimed is:

1. In a full duplex data transmission system having a single signal carrying circuit between at least two separated stations and wherein each station includes both a data transmitter to impress on said circuit data signals represented by discrete frequencies within one frequency band and a data receiver to translate data signals represented by discrete frequencies within another frequency band in said circuit;

the feature comprising a filter for eliminating said discrete frequencies within said transmission frequency band from the input to said receiver;

said filter including an adjustable signal delaying element to receive the signals in said circuit;

switching means controlled by the data signals in said transmitter to set the delay of said delaying element in accordance with the discrete frequency being transmitted; and a signal mixer to combine the output of said delaying element with the signals then in said carrying circuit to supply to said receiver only the circuit data signals which are within said other frequency band.

2. A filter for a data transmission system as set out in claim 1 and in which said delay element comprises:

a shift register having a plurality of positions;

a clock controlling the discrete frequencies of said transmitter and shifting said shift register, the transit time of a signal through said shift register being equal to an odd number of half cycles of the lowest frequency of said transmitter;

one or more connections to said shift register at positions where the transit time is equal to an odd number of half cycles of other transmit frequencies of said transmitter, said switching means selecting for connection to said mixer, the shift register position corresponding to the frequency being transmitted by said transmitter.

3. A filter as set out in claim 1 in which the signal on said signal carrying circuit is delta modulated to generate a series of data representing pulses;

a clock having a frequency integrally related to all of said discrete transmission frequencies and controlling said delta modulator;

a plural order shift register receiving the data pulses from said delta modulator and shifted by the output of said clock;

a connection to an intermediate position of said shift register, said switching means connecting the last or said intermediate position of said shift register to an output line; and a double clock speed line controlling said mixer to alternately select the output of said delta modulator or the switched output of said shift register to said receiver input.

4. A data transmission system operable in a full duplex mode over a single transmission circuit between two or more stations, each station comprising a transmitter connected to said circuit and a receiver connected to said circuit through a filter to isolate said receiver from the data signals put on said circuit by the transmitter at said station;

each station having a frequency controlling clock with a fundamental frequency output and a double fundamental frequency output;

said transmitter of a station comprising a counter driven by said fundamental frequency output and providing an output signal at a preselected count therein and also a selectable output signal at a lesser preselected count therein;

a data input line to control said selectable output signal;

counter reset means responsive to any output signal to reset said counter;

a flip-flop circuit connected to change state at each output signal from said counter and to provide at its output a square wave signal at one or another transmit signal frequency;

a line driver between said flip-flop and said transmission circuit to drive said transmission circuit with a triangular shaped wave having a corresponding frequency;

said receiver of a station being connected to said transmission circuit by a delta modulator controlled by said fundamental clock output to produce pulses representing the total signal on said transmission circuit;

a shift register to store the pulse output of said delta modulator and shifted by said fundamental clock output, said shift register having a number of storage positions equal to said preselected count and having an output tap at a storage position equal to said lesser predetermined count;

a switch controlled by said data input line to connect either the last storage position of said shift register or said output tap of said shift register to its output line;

a mixer circuit controlled by said double fundamental frequency output to alternately connect the output of said switch and the output of said delta modulator to its receiver input;

a counter driven by said mixer circuit to convert the output of said mixer circuit to a data representing signal; and a discriminator to receive the output of said mixer and to convert said data representing signal to the data represented thereby.

* * * * *